US012473831B2

United States Patent
Hong et al.

(10) Patent No.: US 12,473,831 B2
(45) Date of Patent: Nov. 18, 2025

(54) INTELLIGENT TUNNEL SEGMENT MONITORING SYSTEM

(71) Applicant: Shenzhen University, Shenzhen (CN)

(72) Inventors: Chengyu Hong, Shenzhen (CN); Wei Rao, Shenzhen (CN); Yifan Zhang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 430 days.

(21) Appl. No.: 18/097,519

(22) Filed: Jan. 17, 2023

(65) Prior Publication Data

US 2023/0167741 A1  Jun. 1, 2023

(30) Foreign Application Priority Data

Oct. 19, 2022 (CN) .......................... 202211278047.5

(51) Int. Cl.
*E21F 17/18* (2006.01)
*G01H 11/06* (2006.01)
*G01B 7/16* (2006.01)

(52) U.S. Cl.
CPC ............ *E21F 17/18* (2013.01); *G01H 11/06* (2013.01); *G01B 7/18* (2013.01)

(58) Field of Classification Search
CPC .. E21F 17/18; G01B 7/00; G01B 7/16; G01B 7/18
See application file for complete search history.

(56) References Cited

U.S. PATENT DOCUMENTS

| 2014/0105044 A1 | 4/2014 | Baillargeon |
| 2020/0077051 A1 | 3/2020 | Yu et al. |
| 2022/0210040 A1 | 6/2022 | Chen et al. |

FOREIGN PATENT DOCUMENTS

CN    111141219 B  * 11/2020  ............. G01B 11/02

OTHER PUBLICATIONS

CN 107965351 (Year: 2018).*
CN 112902816 (Year: 2021).*

* cited by examiner

*Primary Examiner* — Sunil Singh
(74) *Attorney, Agent, or Firm* — Hemisphere Law, PLLC; Zhigang Ma (57) ABSTRACT

The present disclosure discloses an intelligent tunnel segment monitoring system, including two displacement transfer plates and a dislocation monitoring sensor; the two displacement transfer plates are respectively arranged on two adjacent tunnel segments; the dislocation monitoring sensor is connected to the two displacement transfer plates and is used for detecting relative displacement information between the two displacement transfer plates; when the two tunnel segments do not have a relative displacement, the two displacement transfer plates are located on the same plane; one of the displacement transfer plates is provided with a data acquisition and transmission device; the dislocation monitoring sensor is connected to an external data analysis terminal through the data acquisition and transmission device.

9 Claims, 12 Drawing Sheets

INTELLIGENT TUNNEL SEGMENT MONITORING SYSTEM

CROSS REFERENCE TO RELATED APPLICATION

This patent application claims the benefit and priority of Chinese Patent Application No. 202211278047.5 filed on Oct. 19, 2022, the disclosure of which is incorporated by reference herein in its entirety as part of the present application.

TECHNICAL FIELD

The present disclosure relates to the technical field of tunnel engineering monitoring, in particular to an intelligent tunnel segment monitoring system.

BACKGROUND

In the highly developed modern industry, a sensor application technology is one of the important foundations of modern measurement and control system engineering. The rapid development of an information technology and the wide application of a computer technology have provided a good and reliable scientific and technological foundation for the development of sensors.

Tunnel segment dislocation refers to a phenomenon that adjacent tunnel segments are dislocated in space, resulting in unsmooth inner walls between consecutive tunnel segments. The tunnel segment dislocation is a technical problem and a disease phenomenon that often occur in construction and operation of shield tunnels, and has not got enough attention for a long time. The tunnel segment dislocation not only affects the appearance, but also affects the safety of a tunnel structure, causing segment cracking, falling off, difficulty in assembly, and potential hazard of waterproofing, which threatens the safety of tunnel operation. Therefore, it is strongly necessary to monitor the tunnel segment dislocation.

SUMMARY

The technical problem to be solved in the present disclosure is to provide an intelligent tunnel segment monitoring system for the above shortcomings in the prior art, which aims to monitor a dislocation condition of tunnel segments.

The technical solution used by the present invention to solve the technical problems is as follows:

An intelligent tunnel segment monitoring system includes two displacement transfer plates and a dislocation monitoring sensor; the two displacement transfer plates are respectively arranged on two adjacent tunnel segments; the dislocation monitoring sensor is connected to the two displacement transfer plates and is used for detecting relative displacement information between the two displacement transfer plates; when the two tunnel segments do not have a relative displacement, the two displacement transfer plates are located on the same plane; one of the displacement transfer plates is provided with a data acquisition and transmission device; and the dislocation monitoring sensor is connected to an external data analysis terminal through the data acquisition and transmission device.

According to the intelligent tunnel segment monitoring system, the dislocation monitoring sensor includes a first base, a transmission rod, three telescopic rods and a second base; the first base and the second base are respectively arranged on the two displacement transfer plates; the transmission rod is perpendicular to the displacement transfer plate corresponding to the first base; telescoping directions of every two of the three telescopic rods are perpendicular to each other; one telescopic rod located on the outermost side is connected to the second base and is parallel to the transmission rod; the other telescopic rod located on the outermost side is connected to the transmission rod; and the telescopic rod is used for converting a relative displacement between the two displacement transfer plates into an electric signal when a displacement that is in the same direction as the telescoping direction of the telescopic rod occurs between the two displacement transfer plates.

According to the intelligent tunnel segment monitoring system, each telescopic rod includes a first rod body, a first elastic member, a second elastic member, a third elastic member and a second rod body which are connected in sequence; a graphene resistive sensor chip is also connected between the first elastic member and the third elastic member; the graphene resistive sensor chip is parallel to an elastic telescoping direction of the second elastic member; and the graphene resistive sensor chip is electrically connected to the data acquisition and transmission device.

According to the intelligent tunnel segment monitoring system, an accommodating slot is formed in the first rod body; the first elastic member, the second elastic member, the third elastic member and the graphene resistive sensor chip are all located in the accommodating slot; and when the two tunnel segments do not have a relative displacement, the second rod body is partially located in the accommodating slot.

According to the intelligent tunnel segment monitoring system, the data acquisition and transmission device includes a fixed seat, and a circuit substrate, a data acquisition interface and a wireless signal emission device which are arranged on the fixed seat; the data acquisition interface and the wireless signal emission device are both electrically connected to the circuit substrate; and the data acquisition interface is also electrically connected to the dislocation monitoring sensor.

According to the intelligent tunnel segment monitoring system, each displacement transfer plate is provided with at least three vibration monitoring sensors; the vibration monitoring sensors are used for monitoring vibration acceleration information of the displacement transfer plate; the vibration monitoring sensors are connected to the external data analysis terminal through the data acquisition and transmission device; and every two of all the vibration monitoring sensors are perpendicular to each other.

According to the intelligent tunnel segment monitoring system, each vibration monitoring sensor includes a fixed frame, a mass block and a plurality of sensing subassemblies; the mass block is arranged in a center of the fixed frame and may vibrate along a direction perpendicular to a plane where the fixed frame is located; the plurality of sensing subassemblies connect the mass block to the fixed frame and are uniformly distributed along a circumferential direction of the mass block; and the sensing subassemblies are used for converting the vibration of the mass block into an electric signal.

According to the intelligent tunnel segment monitoring system, each sensing subassembly includes a force transmission rod, a metal equal-strength beam and a graphene resistive sensor chip; the force transmission rod is connected to the mass block and the metal equal-strength beam; the force transmission rod and the metal equal-strength beam are not coplanar; a plane where the force transmission rod is located and a plane where the metal equal-strength beam is located are both perpendicular to a vibration direction of the mass block; one end of the metal equal-strength beam away from the force transmission rod is connected to the fixed frame; and the graphene resistive sensor chip is arranged on the metal equal-strength beam and is electrically connected to the data acquisition and transmission device.

According to the intelligent tunnel segment monitoring system, the graphene resistive sensor chip includes a carrying piece, a graphene conductor layer and a signal transmission line; the graphene conductor layer is arranged in the carrying piece; and the signal transmission line is electrically connected to the graphene conductor layer and the data acquisition and transmission device.

The intelligent tunnel segment monitoring system further includes a plurality of fixed rods; the plurality of fixed rods are respectively connected to the mass block and are uniformly distributed along the circumferential direction of the mass block; an inner side surface of the fixed frame is provided with an open slot; one end of each fixed rod is inserted into the open slot; two sides of the fixed rod along the direction perpendicular to the plane where the fixed frame is located are provided with elastic members; and the elastic members are connected to the fixed frame.

Beneficial effects: In the present disclosure, one dislocation monitoring sensor is connected to the two displacement transfer plates, and the displacement information monitored by the dislocation monitoring sensor is transmitted to the external data analysis terminal via the data acquisition and transmission device; a relative displacement direction and a relative displacement amount between the two displacement transfer plates are obtained by calculating and analyzing the displacement information by the external data analysis terminal, thus learning whether there is a dislocation phenomenon between two adjacent tunnel segments and obtaining the relative displacement direction and the relative displacement amount if a dislocation phenomenon occurs, so that working personnel clearly knows about a dislocation condition of the tunnel segments.

DETAILED DESCRIPTION OF THE EMBODIMENTS

To make the objectives, technical solutions and advantages of the present disclosure clearer, the present disclosure is further described below in detail with reference to accompanying drawings and embodiments. It should be understood that the specific embodiments described here are merely to illustrate and explain the present disclosure, and not intended to limit the present disclosure.

Figure 1:
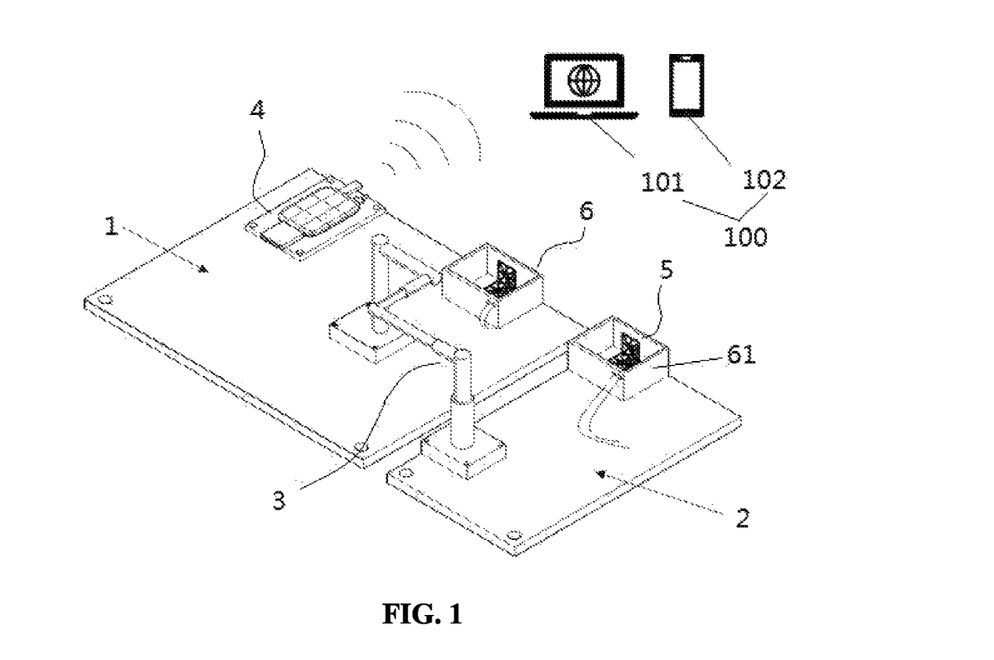
FIG. 1 is a schematic structural diagram of an intelligent tunnel segment monitoring system in the present disclosure.

The present disclosure provides an intelligent tunnel segment monitoring system. As shown in FIG. 1, the intelligent tunnel segment monitoring system includes two displacement transfer plates (a first displacement transfer plate 1 and a second displacement transfer plate 2), and a dislocation monitoring sensor 3. The two displacement transfer plates are respectively arranged on two adjacent tunnel segments. The dislocation monitoring sensor 3 is connected to the two displacement transfer plates, that is, one end of the dislocation monitoring sensor 3 is connected to the first displacement transfer plate 1, and the other end is connected to the second displacement transfer plate 2. The dislocation monitoring sensor 3 is used for detecting relative displacement information between the two displacement transfer plates, and the displacement information between the two displacement transfer plates is equivalent to displacement information between two tunnel segments.

The first displacement transfer plate 1 and the second displacement transfer plate 2 are adjacent to each other and are disposed at an interval. One displacement transfer plate is provided with a data acquisition and transmission device 4. The dislocation monitoring sensor 3 is connected to an external data analysis terminal 100 through the data acquisition and transmission device 4. The external data analysis terminal 100 is used for acquiring data output by the dislocation monitoring sensor and analyzing and calculating the data, thus acquiring a dislocation condition of two adjacent tunnel segments.

When there is no dislocation phenomenon, i.e. no relative displacement, between the two tunnel segments, inner walls of the two tunnel segments are smooth, and the two displacement transfer plates are located on the same plane. When the two tunnel segments have a relative displacement, that is, when at least one of the two tunnel segments moves, the displacement transfer plate corresponding to the tunnel segment moves. The dislocation monitoring sensor 3 detects the relative displacement information between the two displacement transfer plates and transmits the displacement information to the external data analysis terminal 100 through the data acquisition and transmission device 4, so that the external data analysis terminal 100 analyzes the displacement information, thus acquiring whether there is a dislocation phenomenon between the two tunnel segments and acquiring a relative displacement direction and a relative displacement amount.

In the present disclosure, one dislocation monitoring sensor 3 is connected to the two displacement transfer plates, and the displacement information monitored by the dislocation monitoring sensor 3 is transmitted to the external data analysis terminal 100 via the data acquisition and transmission device 4; a relative displacement direction and a relative displacement amount between the two displacement transfer plates are obtained by calculation and analysis by the external data analysis terminal 100, thus learning whether there is a dislocation phenomenon between two adjacent tunnel segments and obtaining the relative displacement direction and the relative displacement amount if a dislocation phenomenon occurs, so that working personnel clearly knows about a dislocation condition of the tunnel segments.

Figure 4:
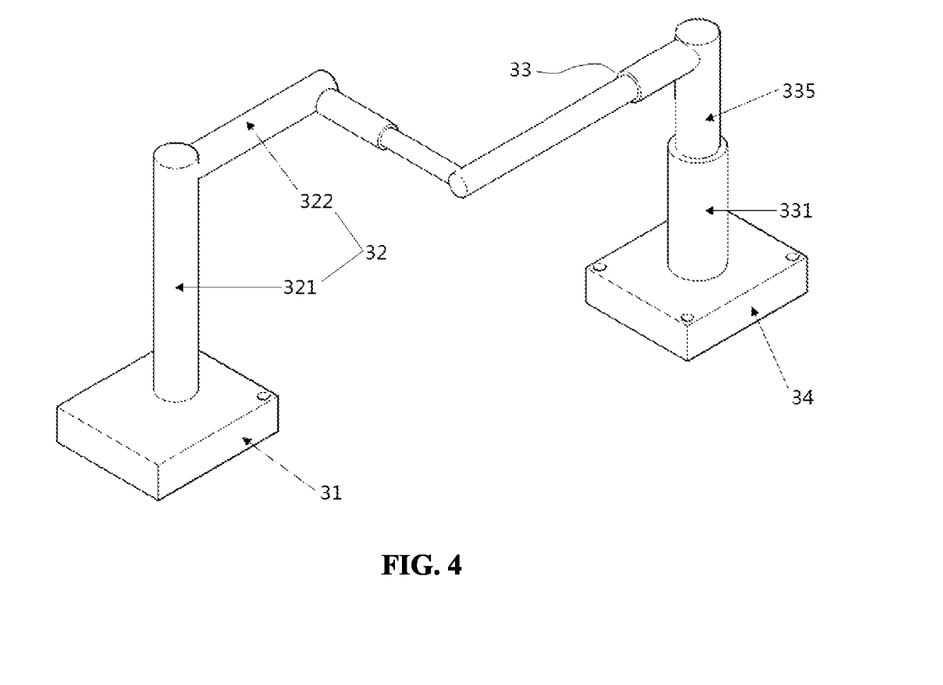
FIG. 4 is a schematic structural diagram of the dislocation monitoring sensor in the present disclosure.

As shown in FIG. 4, the dislocation monitoring sensor 3 includes a first base 31, a transmission rod 32, three telescopic rods 33 and a second base 34; the first base 31 and the second base 34 respectively correspond to the two displacement transfer plates. Specifically, the first base 31 is arranged on the first displacement transfer plate 1; and the second base 34 is arranged on the second displacement transfer plate 2. The transmission rod 32 is perpendicular to the first displacement transfer plate 1; and one end of the transmission rod 32 away from the first base 31 is connected to the telescopic rods 33. The telescopic rods 33 are used for converting the relative displacement between the two displacement transfer plates into an electric signal when a displacement that is in the same direction as telescoping directions of the telescopic rods occurs between the two displacement transfer plates. The three telescopic rods 33 (a first telescopic rod, a second telescopic rod and a third telescopic rod) are connected in sequence, and the telescoping directions of every two of the three telescopic rods 33 are perpendicular to each other, that is, the telescoping directions of the three telescopic rods 33 are distributed on an X axis, a Y axis and a Z axis, thus detecting, when the dislocation phenomenon occurs, a direction among the three axial directions where the relative displacement between two adjacent tunnel segments is. When the two tunnel segments do not have a relative displacement, the telescopic rod in the Z axial direction, i.e. the first telescopic rod, is flush with the height of the transmission rod 32.

The telescopic rod (the first telescopic rod) of the three telescopic rods 33 located on the outermost side is connected to the second base 34, and the first telescopic rod is parallel to the transmission rod 32. That is, the first telescopic rod is used for detecting a relative displacement between the two displacement transfer plates along the Z axial direction. The other telescopic rod (the third telescopic rod) located on the outermost side is connected to the transmission rod 32. Specifically, the third telescopic rod is connected to one end of the transmission rod 32 away from the first base 31. When the second telescopic rod is used for detecting a displacement of the two displacement transfer plates along the X axial direction, the third telescopic rod is used for detecting a displacement of the two displacement transfer plates along the Y axial direction (the telescoping direction of the second telescopic rod can also be defined to be on the Y axis, and the telescoping direction of the third telescopic rod can also be defined to be on the X axis, as long as the telescoping directions of the second telescopic rod and the third telescopic rod are perpendicular to each other).

Connection between two adjacent telescopic rods 33, connection between the transmission rod 32 and the third telescopic rod and connection between the first telescopic rod and the second base 34 are all fixed connections.

In one specific embodiment of the present disclosure, the transmission rod 32 is a "—"-shaped transmission rod 32.

According to another specific embodiment in the present disclosure, as shown in FIG. 4, the transmission rod 32 is an L-shaped transmission rod. The transmission rod 32 includes a perpendicular portion 321 and a horizontal portion 322 which are perpendicularly connected; the perpendicular portion 321 is perpendicularly connected to the first base 31; the horizontal portion 322 is connected to the third telescopic rod; and the horizontal portion 322 is perpendicular to the third telescopic rod. Compared with the "—"-shaped transmission rod 32, the L-shaped transmission rod 32 can prolong a distance between the first base 31 and the second base 34, so that a mounting position of the first base 31 on the first displacement transfer plate 1 is closer to a center of the first displacement transfer plate 1, and/or a mounting position of the second base 34 on the second displacement transfer plate 2 is closer to a center of the second displacement transfer plate 2, so that whether the first displacement transfer plate 1 and the second displacement transfer plate 2 have a relative displacement is detected more sensitively.

Figure 5:
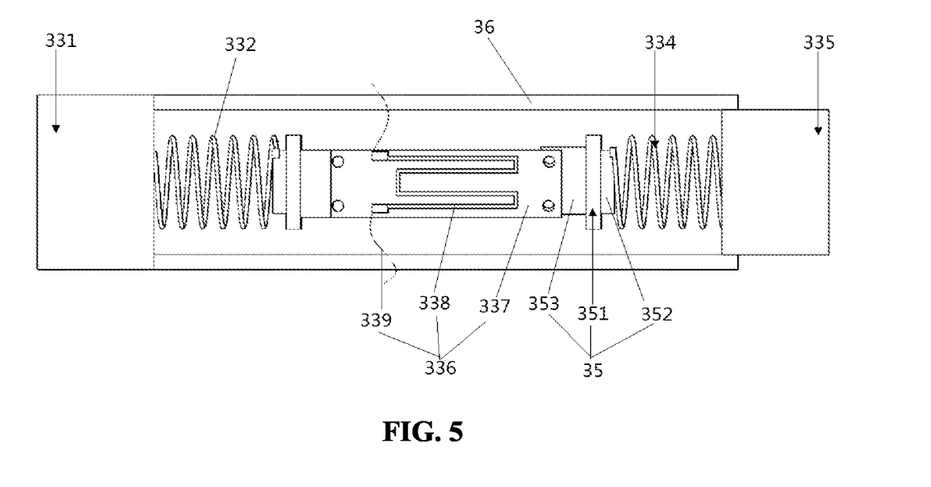
FIG. 5 is a first view of the telescopic rod in the present disclosure.
Figure 6:
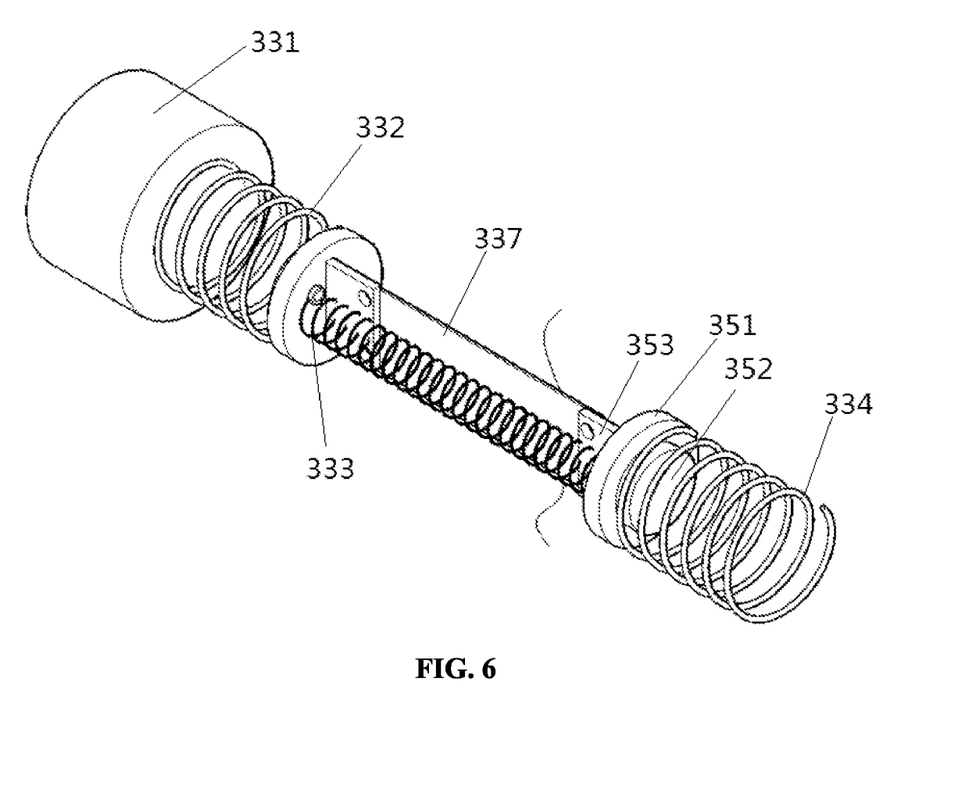
FIG. 6 is a second view of the telescopic rod in the present disclosure.

As shown in FIG. 5 and FIG. 6, each telescopic rod 33 includes a first rod body 331, a first elastic member 332, a second elastic member 333, a third elastic member 334, a second rod body 335 and a graphene resistive sensor chip 336. The first rod body 331, the first elastic member 332, the third elastic member 334 and the second rod body 335 which are disposed in sequence; the second elastic member 333 and the graphene resistive sensor chip 336 are arranged side by side between the first elastic member 332 and the third elastic member 334; and a lengthwise direction of the graphene resistive sensor chip 336 is parallel to an elastic telescoping direction of the second elastic member 333. Specifically, one end of the first elastic member 332 along the elastic telescoping direction is connected to the first rod body 331, and the other end is connected to the second elastic member 333 and the graphene resistive sensor chip 336 through a connector 35; one end of the third elastic member 334 along the elastic telescoping direction is connected to the second rod body 335, and the other end is connected to the second elastic member 333 and the graphene resistive sensor chip 336 through a connector 35. The first elastic member 332 and the third elastic member 334 are located on one straight line, and the elastic telescoping direction of the first elastic member 332 is parallel to that of the second elastic member 333.

The graphene resistive sensor chip 336 is electrically connected to the data acquisition and transmission device 4. According to one specific embodiment in the present disclosure, when the two displacement transfer plates have a relative displacement, and the second displacement transfer plate 2 is raised upwards relative to the first displacement transfer plate 1, the second telescopic rod and the third telescopic rod do not elastically stretch out and draw back, but only the second base 34 drives the first rod body 331 in the first telescopic rod to upwards move relative to the second rod body 335; the first elastic member 332, the second elastic member 333 and the third elastic member 334 all elastically draw back upwards; the graphene resistive sensor chip 336 in the first telescopic rod generates a strain change, and a resistance value of the graphene resistive sensor chip changes with the strain change; that is, a displacement physical quantity of dislocation between the two displacement transfer plates is converted into a resistance value of the graphene resistive sensor chip 336, and the resistance value is transmitted to the external data analysis terminal 100 through the data acquisition and transmission device 4; and the external data analysis terminal 100 performs analysis and calculation according to the resistance value to obtain a displacement amount of the two displacement transfer plates along the Z axial direction, thus obtaining a displacement amount of the dislocation of two tunnel segments along the Z axial direction. That is, the external data analysis terminal 100 can acquire a numerical value of the displacement physical quantity of the dislocation of the tunnel segments according to the electric signal output by the dislocation monitoring sensor 3.

It is known that the stiffness coefficients of the first elastic member 332 and the third elastic member 334 are both K1, and the stiffness coefficient of the second elastic member 333 is K2. When a displacement in the Z axial direction occurs between two tunnel segments, a deformation of the graphene resistive sensor chip 336 is:

$$x_g = \frac{\Delta x K_1}{2K_2 + K_1}$$

The deformation of the graphene resistive sensor chip 336 may cause resistance output by the graphene resistive sensor chip 336 to change. The resistance is transmitted to the external data analysis terminal 100 through the data acquisition and transmission device 4, so that a displacement amount of the dislocation of two tunnel segments along the Z axial direction can be calculated through the external data analysis terminal 100.

In the present disclosure, elastic members are respectively arranged on one side and at two ends of the graphene resistive sensor chip 336. The three elastic members (the first elastic member 332, the second elastic member 333 and the third elastic member 334) reduce the stretching quantity of the graphene resistive sensor chip 336 and increase a measuring range of the graphene resistive sensor chip 336, so that the graphene resistive sensor chips 336 in the three telescopic rods 33 can more sensitively monitor dislocations of two tunnel segments in the X, Y and Z axial directions.

As shown in FIG. 5, illustrating an internal structure of the graphene resistive sensor chip 336, the graphene resistive sensor chip 336 includes a carrying piece 337, a graphene conductor layer 338 and signal transmission lines 339; the graphene conductor layer 338 is arranged in the carrying piece 337; and two ends of the graphene conductor layer 338 are respectively electrically connected to the data acquisition and transmission device 4 through the signal transmission lines 339. According to one specific embodiment in the present disclosure, the carrying piece 337 is a polydimethylsiloxane (PDMS) carrying piece. When the two displacement transfer plates have a relative displacement, the carrying piece 337 in the telescopic rod 33 having the telescoping direction that is the same as the relative displacement direction of the relative displacement deforms, and the resistance of the corresponding graphene conductor layer 338 changes; the displacement physical quantity of the dislocation between the two displacement transfer plates is converted into the resistance value of the graphene conductor layer 338, and the resistance value is transmitted to the external data analysis terminal 100 through the data acquisition and transmission device 4; and the external data analysis terminal 100 performs analysis and calculation according to the resistance value to obtain a displacement amount of the two displacement transfer plates along the telescoping direction of the telescopic rod 33, thus obtaining a displacement amount of the dislocation of two tunnel segments along the telescoping direction of the telescopic rod 33. The graphene conductor layer 338 and the signal transmission lines 339 are all located on one side of the carrying piece 337 facing away from the second elastic member 333.

The graphene resistive sensor chip 336 adopting the graphene conductor layer 338 has excellent performance of good flexibility and high sensitivity and is not susceptible to electromagnetic interference.

The connector 35 located between the third elastic member 334 and the graphene resistive sensor chip 336 is taken as an example below to specifically describe the structure of the connector 35: As shown in FIG. 5, the connector 35 includes a mounting boss 351, a positioning shaft 352 and a positioning sheet 353; and the positioning shaft 352 and the positioning sheet 353 are respectively located on two opposite sides of the mounting boss 351. As shown in FIG. 6, the mounting boss 351 is connected to the second elastic member 333 through a bolt, and one end of the positioning sheet 353 away from the mounting boss 351 is connected to the carrying piece 337. The third elastic member 334 is sleeved on the positioning shaft 352 and presses against the mounting boss 351. The third elastic member 334 is also connected to the positioning shaft 352 through a bolt.

Further, as shown in FIG. 5, the first rod body 331 is provided with an accommodating slot 36; the first elastic member 332, the second elastic member 333, the third elastic member 334 and the graphene resistive sensor chip 336 are all located in the accommodating slot 36. When the two tunnel segments do not have a relative displacement, the second rod body 335 is partially located in the accommodating slot 36, so that when the two tunnel segments have a relative displacement, the first rod body 331, the first elastic member 332, the second elastic member 333, the third elastic member 334 and the second rod body 335 all linearly move to ensure the detection precision and accuracy of the dislocation monitoring sensor 3.

Figure 10:
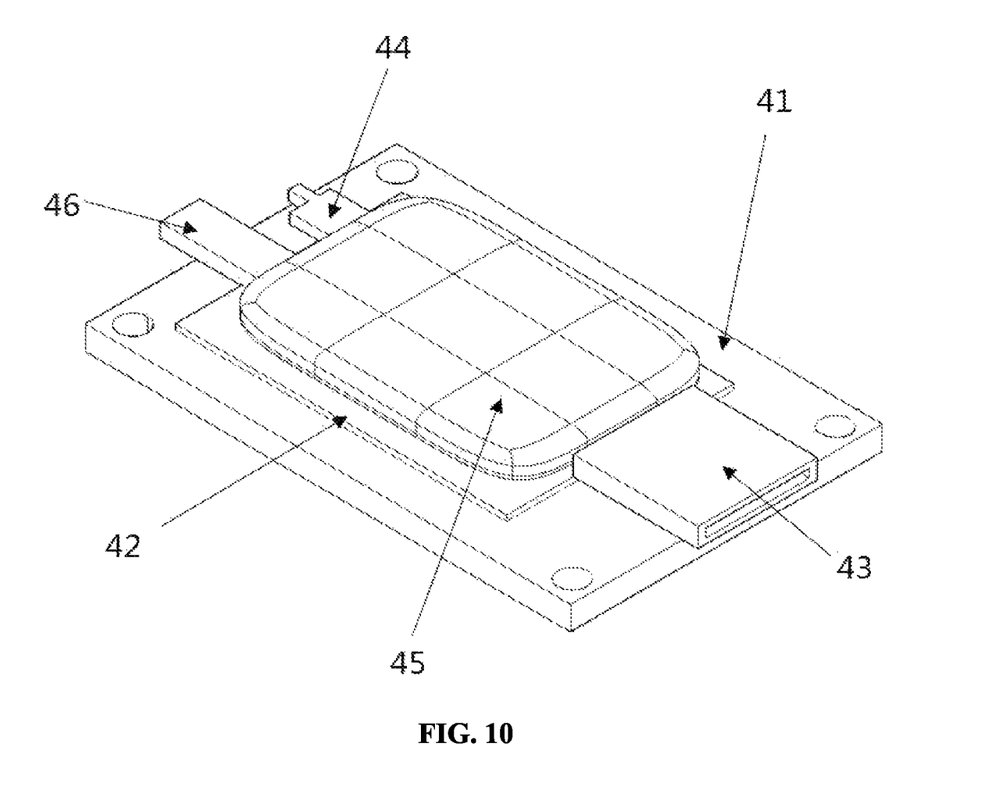
FIG. 10 is a schematic structural diagram of the data acquisition and transmission device in the present disclosure.

As shown in FIG. 10, the data acquisition and transmission device 4 includes a fixed seat 41, and a circuit substrate 42, a data acquisition interface 43 and a wireless signal emission device 44 which are arranged on the fixed seat 41; the data acquisition interface 43 and the wireless signal emission device 44 are both electrically connected to the circuit substrate 42; and the data acquisition interface 43 is also electrically connected to the dislocation monitoring sensor 3. The wireless signal emission device 44 is wirelessly connected to the external data analysis terminal 100; after the circuit substrate 42 acquires, through the data acquisition interface 43, a resistance change signal transmitted by the dislocation monitoring sensor 3, the electric signal is transmitted to the external data analysis terminal 100 through the wireless signal emission device 44. The external data analysis terminal 100 is used for acquiring data output by the vibration monitoring sensors and analyzing and calculating the data to acquire vibration conditions of tunnel segments provided with the vibration monitoring sensors.

A battery 45 is also arranged on the circuit substrate 42. The battery 45 is a high-capacity battery. The battery 45 is a rechargeable battery. The battery 45 is provided with a charging port 46, so as to be connected to an external power supply through the charging port 46 to supply power to the circuit substrate 42.

Figure 8:
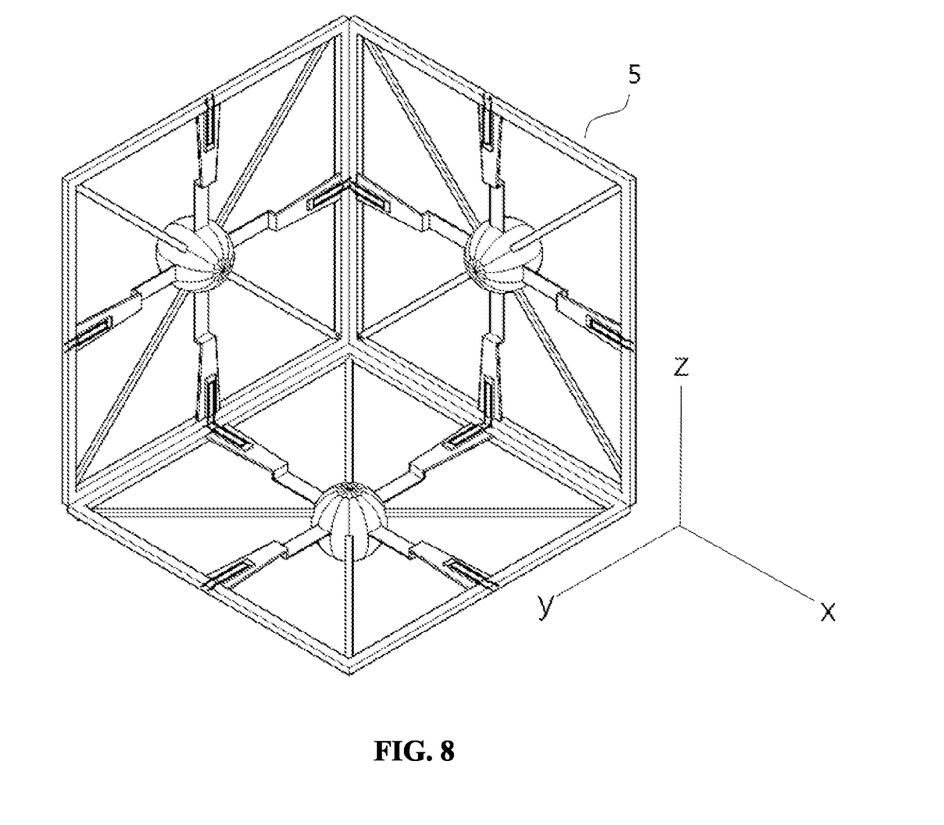
FIG. 8 is a schematic assembling diagram of the three vibration monitoring sensors in the present disclosure.

As shown in FIG. 1 and FIG. 8, each displacement transfer plate is provided with at least three vibration monitoring sensors 5. The vibration monitoring sensors 5 are used for monitoring vibration acceleration information of the corresponding displacement transfer plate. The vibration monitoring sensors 5 are connected to the external data analysis terminal 100 through the data acquisition and transmission device 4, so as to acquire the vibration condition of the tunnel segment corresponding to the displacement transfer plate through the external data analysis terminal 100. Specifically, the vibration monitoring sensors 5 are electrically connected to the data acquisition interface 43.

Every two of all the vibration monitoring sensors 5 are perpendicular to each other, thus monitoring the vibration conditions of the displacement transfer plate in the X, Y and Z axial directions. According to one specific embodiment in the present disclosure, there are three vibration monitoring sensors 5. A connection manner for the three vibration monitoring sensors (a first vibration monitoring sensor, a second vibration monitoring sensor and a third vibration monitoring sensor) is as shown in the figure: every two of the three vibration monitoring sensors 5 are connected. The first vibration monitoring sensor is parallel to the displacement transfer plate to monitor a vibration of the displacement transfer plate along the Z axial direction; two adjacent sides of the first vibration monitoring sensor are respectively connected to the second vibration monitoring sensor and the third vibration monitoring sensor; the second vibration monitoring sensor is used for monitoring a vibration of the displacement transfer plate along the X axial direction; and the third vibration monitoring sensor is used for monitoring a vibration of the displacement transfer plate along the Y axial direction.

Figure 7:
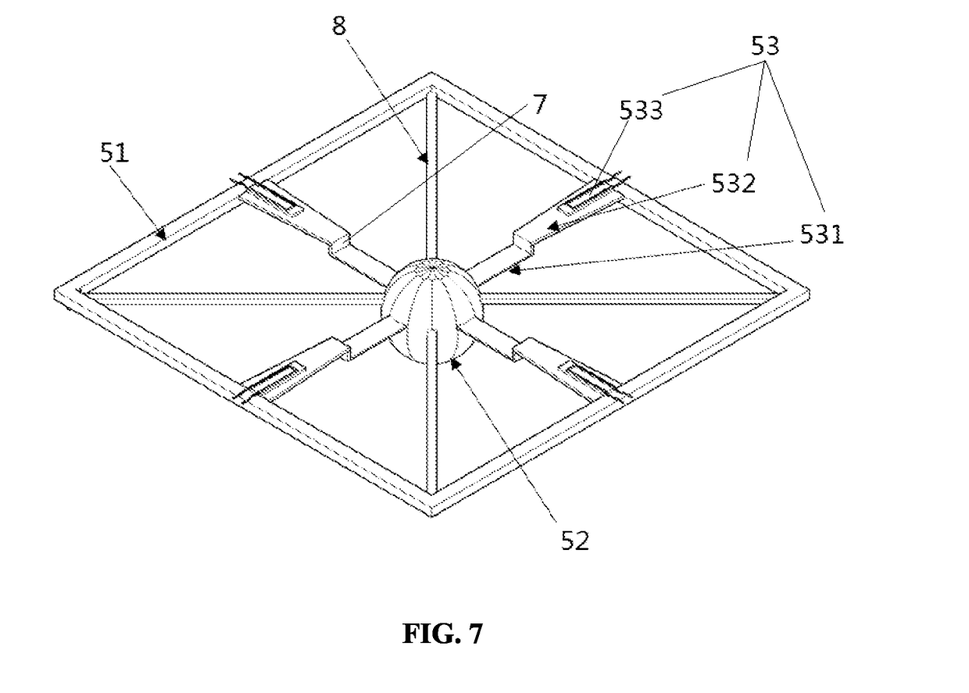
FIG. 7 is a schematic structural diagram of the vibration monitoring sensor in the present disclosure.

As shown in FIG. 7, each vibration monitoring sensor 5 includes a fixed frame 51, a mass block 52 and a plurality of sensing subassemblies 53; the mass block 52 is arranged in a center of the fixed frame 51 and may vibrate relative to the fixed frame 51; and a vibration direction of the mass block 52 is perpendicular to a plane where the fixed frame 51 is located. The plurality of sensing subassemblies 53 are located in the fixed frame 51 and are uniformly distributed along a circumferential direction of the mass block 52. The plurality of sensing subassemblies 53 are respectively connected to the mass block 52 and the fixed frame 51. The sensing subassemblies 53 are used for converting the vibration of the mass block 52 into an electric signal; and the sensing subassemblies 53 are electrically connected to the data acquisition and transmission device 4.

As shown in FIG. 1, the displacement transfer plate is provided with a positioning frame 6; the positioning frame 6 includes four positioning plates 61; and the four positioning plates 61 are connected end to end in sequence to form a closed-loop structure. The three vibration monitoring sensors 5 are located in the positioning frame 6, and the first vibration monitoring sensor is connected to the displacement transfer plate through a bracket; the bracket separates the first vibration monitoring sensor from the displacement transfer plate, so as to provide a displacement space for the vibration of the mass block 52. Similarly, the second vibration monitoring sensor and the third vibration monitoring sensor are respectively connected to two adjacent positioning plates 61 through the corresponding brackets to ensure the connection stability of the second vibration monitoring sensor and the third vibration monitoring sensor on the displacement transfer plate. When the displacement transfer plate vibrates, the vibration monitoring sensors corresponding to the vibration direction of the displacement transfer plate can inevitably synchronously vibrate with the displacement transfer plate.

As shown in FIG. 7, each sensing subassembly 53 includes a force transmission rod 531, a metal equal-strength beam 532 and a graphene resistive sensor chip 533; the force transmission rod 531 is connected to the mass block 52 and the metal equal-strength beam 532; the force transmission rod 531 and the metal equal-strength beam 532 are not coplanar; and a plane where the force transmission rod 531 is located and a plane where the metal equal-strength beam 532 is located are both perpendicular to the vibration direction of the mass block 52. That is, the force transmission rod 531 and the metal equal-strength beam 532 are disposed at higher and lower positions or lower and higher positions along the vibration direction of the mass block 52, so that a vibration force generated by the vibration of the mass block 52 can be effectively transmitted to the metal equal-strength beam 532. One end of the metal equal-strength beam 532 away from the force transmission rod 531 is connected to the fixed frame 51; and the graphene resistive sensor chip 533 is arranged on the metal equal-strength beam 532 and is electrically connected to the data acquisition and transmission device 4. When the displacement transfer plate vibrates, the fixed frame 51 vibrates to drive the mass block 52 to vibrate. The vibration of the mass block 52 drives the metal equal-strength beam 532 and the graphene resistive sensor chip 533 to deform, thus changing the resistance of the graphene resistive sensor chip 533; and an acceleration physical quantity of the vibration of the displacement transfer plate is converted into a resistance value of the graphene resistive sensor chip 533. The resistance value is transmitted to the external data analysis terminal 100 through the data acquisition and transmission device 4. The external data analysis terminal 100 performs analysis and calculation according to the resistance value to obtain a displacement amount of the displacement transfer plate along the vibration direction of the mass block 52, thus obtaining a vibration displacement amount of the tunnel segment.

Therefore, in the present disclosure, accelerations of the displacement transfer plate along the X, Y and Z axial directions can be simultaneously monitored through the three vibration monitoring sensors 5, and the vibration condition of the tunnel segment corresponding to the displacement transfer plate is reflected through the accelerations in the three axial directions.

The structure of the graphene resistive sensor chip 533 in the vibration monitoring sensor 5 is the same as that of the graphene resistive sensor chip in the dislocation monitoring sensor 3, so the structure of the graphene resistive sensor chip 533 in the vibration monitoring sensor 5 will not be repeatedly described here.

According to one specific embodiment in the present disclosure, as shown in the figure, for the first vibration monitoring sensor, a distance between the metal equal-strength beam 532 and the displacement transfer plate is greater than a distance between the force transmission rod 531 and the displacement transfer plate. For the second vibration monitoring sensor and the third vibration monitoring sensor, a distance between the metal equal-strength beam 532 and the corresponding positioning plate is greater than a distance between the force transmission rod 531 and the corresponding positioning plate.

According to one specific embodiment in the present disclosure, the metal equal-strength beam 532 is an isosceles trapezoid metal equal-strength beam 532, a loading stress of which is equal on every part, so that a strain on each section of the graphene resistive sensor chip 533 is the same to improve the accuracy and sensitivity of vibration monitoring of the vibration monitoring sensor 5. An upper bottom of the isosceles trapezoid metal equal-strength beam 532 is connected to the force transmission rod 531, and a lower bottom is connected to the fixed frame 51. The mass block 52 is a spherical mass block.

As shown in FIG. 7, a connection rod 7 is arranged between the metal equal-strength beam 532 and the force transmission rod 531; the connection rod 7 is perpendicular to the force transmission rod 531 and the metal equal-strength beam 532, and two ends of the connection rod 7 are respectively connected to the force transmission rod 531 and the metal equal-strength beam 532 to support the force transmission rod 531 and the metal equal-strength beam 532.

Figure 9:
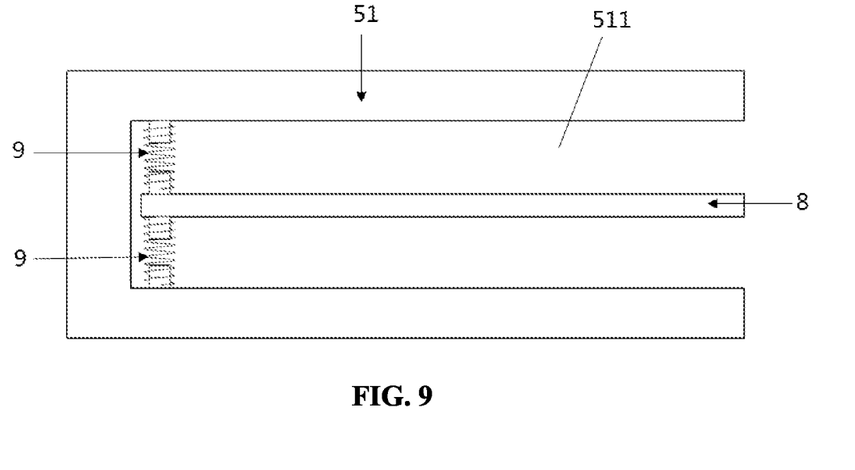
FIG. 9 is a schematic assembling diagram of the fixed rod and the fixed frame in the present disclosure.

As shown in FIG. 7, the intelligent tunnel segment monitoring system further includes a plurality of fixed rods 8. The plurality of fixed rods 8 are respectively connected to the mass block 52 and are uniformly distributed along the circumferential direction of the mass block 52. As shown in FIG. 9, an inner side surface of the fixed frame 51 facing to the mass block 52 is provided with an open slot 511; one end of each fixed rod 8 is inserted into the open slot 511; two sides of the fixed rod 8 along the direction perpendicular to the plane where the fixed frame 51 is located are provided with elastic members 9; the two sides of the fixed rod 8 along the direction perpendicular to the plane where the fixed frame 51 is located are respectively connected to the fixed frame 51 through the elastic members 9, so that when the displacement transfer plate vibrates to drive the fixed frame 51 to vibrate, the mass block 52 can vibrate, and the vibration direction of the mass block 52 is the same as that of the displacement transfer plate.

According to one specific embodiment in the present disclosure, the fixed frame 51 is a square fixed frame. There are four sensing subassemblies 53 which are respectively connected to middle points of four edges of the fixed frame 51. One fixed rod 8 is arranged between every two adjacent sensing subassemblies 53, and the fixed rods 8 are connected to corners of the fixed frame 51.

Figure 11:
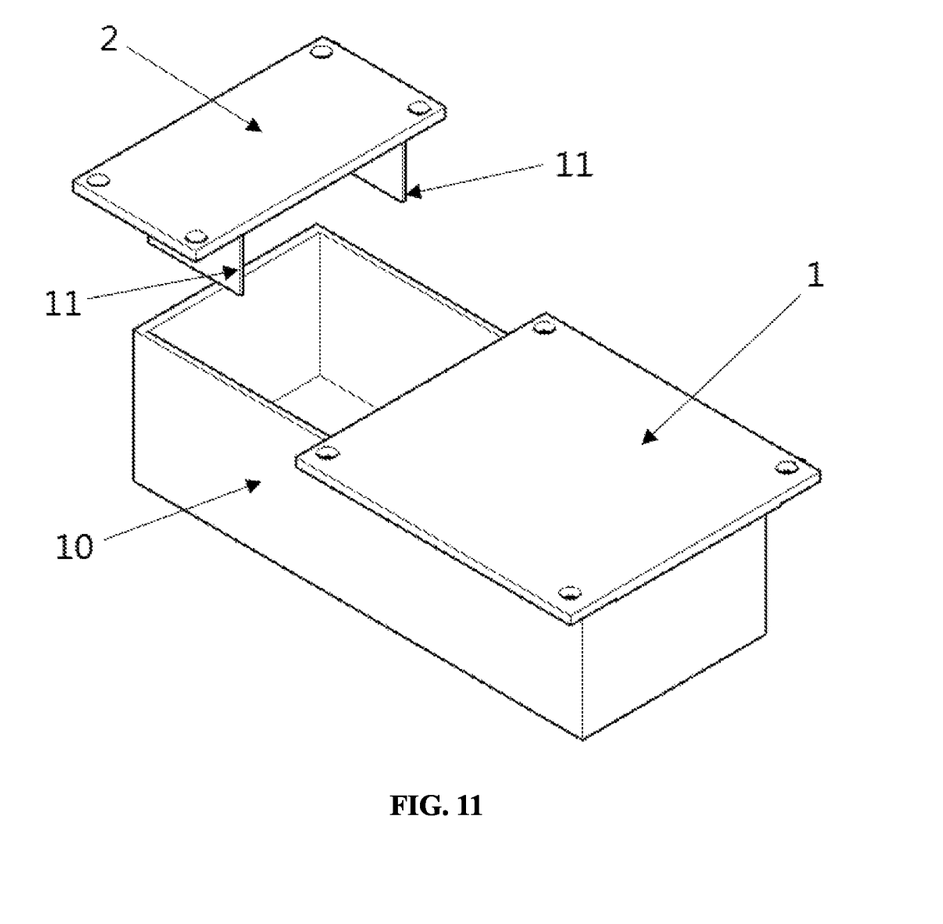
FIG. 11 is a schematic assembling diagram of the protection shell and the two displacement transfer plates in the present disclosure.

As shown in FIG. 11, the intelligent tunnel segment monitoring system further includes a protection shell 10. The protection shell 10 is fastened on the two displacement transfer plates to accommodate the dislocation monitoring sensors 3, the vibration monitoring sensors 5, the positioning frames 6 and the data acquisition and transmission devices 4 on the two displacement transfer plates, so as to protect all the above-mentioned components. The protection shell 10 is fixedly connected to one of the two displacement transfer plates, and the protection shell 10 is not connected to the other displacement transfer plate, so as to ensure that a relative dislocation in a positional space can occur between the displacement transfer plate and the protection shell 10. As shown in FIG. 11, according to one specific embodiment in the present disclosure, the protection shell 10 is fixedly connected to the first displacement transfer plate 1, and the protection shell 10 is not connected to the second displacement transfer plate 2. In FIG. 11, the second displacement transfer plate 2 is in no contact with the protection shell 10, which is only used to explain that the second displacement transfer plate 2 is not connected to the protection shell 10. In practical use, when two adjacent tunnel segments do not have a relative displacement, the second displacement transfer plate 2 is in contact with the protection shell 10.

The displacement transfer plate (the second displacement transfer plate 2) which is not connected to the protection shell 10 is symmetrically provided with two baffle plates 11. The two baffle plates 11 are located in the protection shell 10 and are spaced apart from a side wall of the protection shell 10 by a gap. The gap can satisfy the relative dislocation of this displacement transfer plate relative to the protection shell 10. All the components on this displacement transfer plate are located between the two baffle plates 11 to avoid such a phenomenon that when the protection shell 10 and this displacement transfer plate have a relative dislocation, all the components on this displacement transfer plate are collided with and broken by the protection shell 10.

Figure 12:
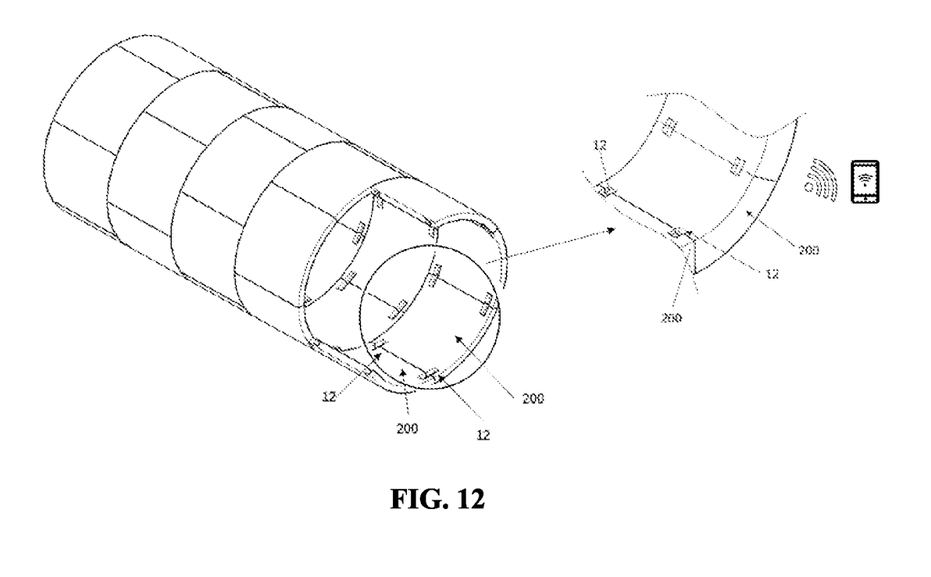
FIG. 12 is a schematic structural diagram of a tunnel segment in the present invention.

As shown in FIG. 12, two ends of each tunnel segment 200 along the circumferential direction are provided with two reserved slots 12 at an interval; the reserved slots 12 are located on an inner side surface of the tunnel segment 200. A distance between the two reserved slots 12 is L. The reserved slots of two adjacent tunnel segments 200 are communicated with each other in a one-to-one correspondence manner to cooperatively mount the two displacement transfer plates. In two adjacent tunnel segments 200, it can be obtained via monitoring by the intelligent tunnel segment monitoring system in two correspondingly communicated reserved slots that: relative displacements of two adjacent tunnel segments 200 along the Y and Z axial directions are respectively $y_1$ and $z_1$; and it can be obtained via monitoring by the intelligent tunnel segment monitoring system in the other two correspondingly communicated reserved slots that: relative displacements of two adjacent tunnel segments 200 along the Y and Z axial directions are respectively $y_2$ and $z_2$; and relative rotation angles of the two adjacent tunnel segments 200 respectively around the Y axis and the Z axis can be calculated through the external data analysis terminal 100:

$$\theta_y = \arctan\frac{|z_1 - z_2|}{L}, \theta_z = \arctan\frac{|y_1 - y_2|}{L}$$

Figure 2:
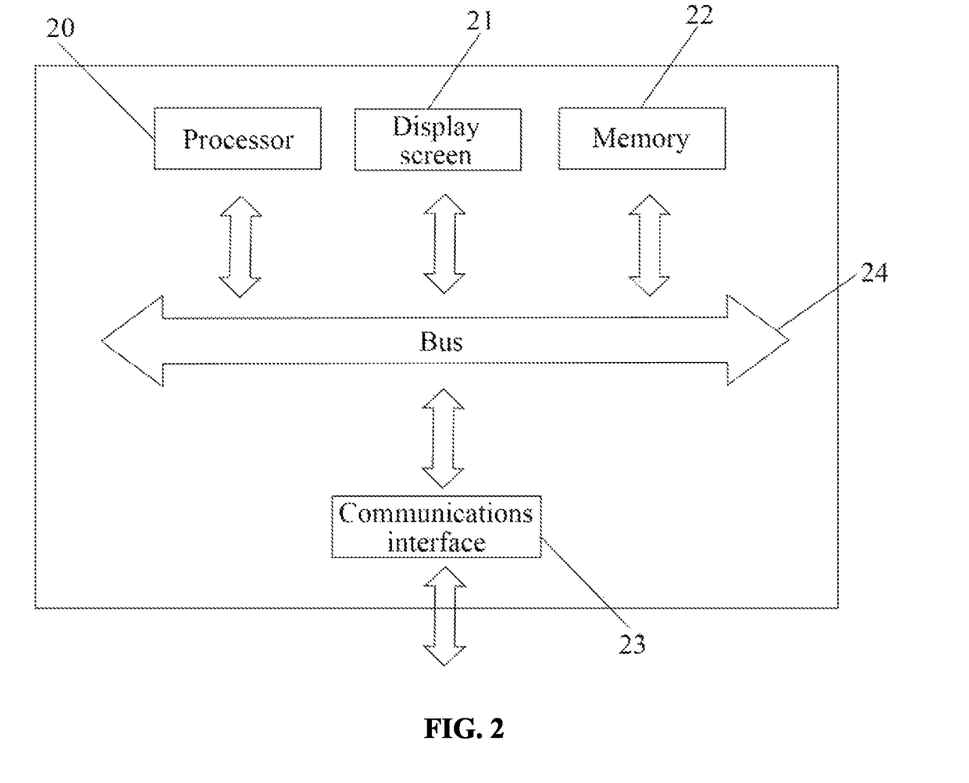
FIG. 2 is a functional principle block diagram of the external data analysis terminal in the present disclosure.
Figure 3:
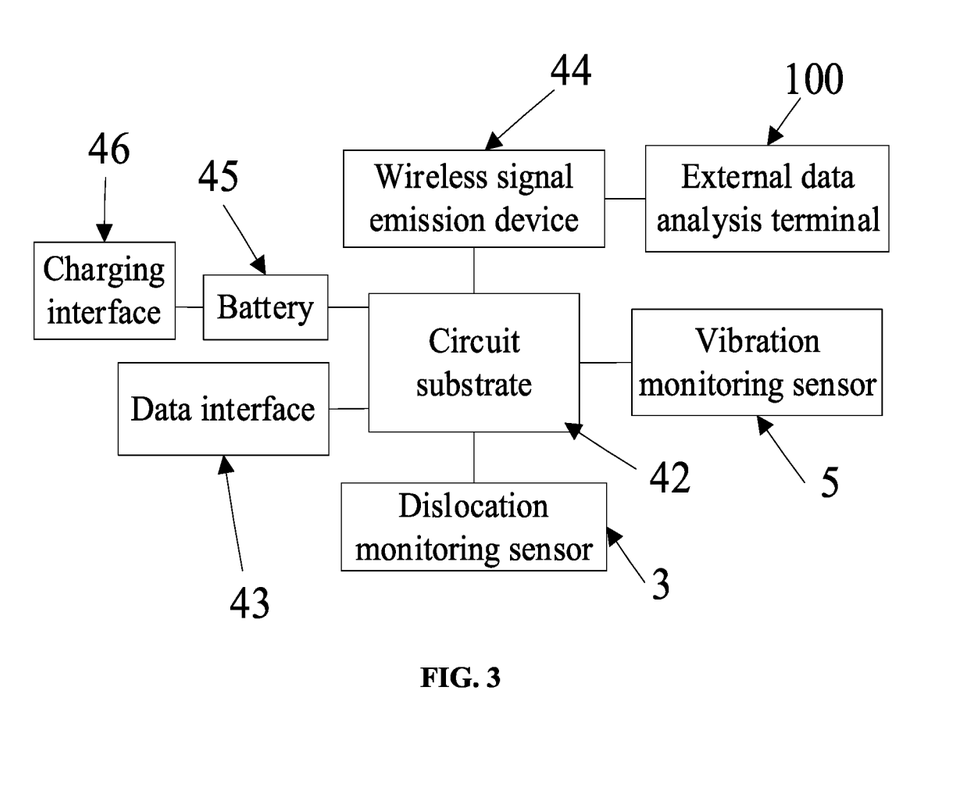
FIG. 3 is a functional principle block diagram of the intelligent tunnel segment monitoring system in the present disclosure.

As shown in FIG. 1, the external data analysis terminal 100 may be a computer 101, a mobile phone 102 and other terminal devices. As shown in FIG. 2, the external data analysis terminal 100 includes at least one processor 20, a display screen 21 and a memory 22, and can further include a communications interface 23 and a bus 24. The processor 20, the display screen 21, the memory 22 and the communication interface 23 can complete inter-communications via the bus 24. The display screen 21 is configured to display a preset user guidance interface in an initial setting mode. The communications interface 23 may transmit information. The processor 20 may call a logical instruction in the memory 22 to acquire, analyze and calculate data signals output by the dislocation monitoring sensor and the vibration monitoring sensors.

In addition, the logical instruction in the above memory 22 can be implemented in the form of a software functional unit and sold or used as a standalone product, may be stored in a computer-readable storage medium.

As a computer-readable storage medium, the memory 22 may be configured to store software programs and computer-executable programs, such as program instructions or modules corresponding to the methods in the embodiments of the present disclosure. The processor 20 runs the software programs, instructions or modules stored in the memory 22 to execute functional applications and data processing, thus acquiring, analyzing and calculating the data signals output by the dislocation monitoring sensor and the vibration monitoring sensors.

According to the above, the present disclosure provides an intelligent tunnel segment monitoring system. The displacement transfer plates are respectively arranged on two adjacent tunnel segments; the dislocation monitoring sensor, the vibration monitoring sensors and the data acquisition and transmission device are arranged on the displacement transfer plates, and the data acquisition and transmission device is connected to the external data analysis terminal; the used graphene resistive sensor chip has the excellent performance of good corrosion resistance, high sensitivity and light weight, and is not susceptible to electromagnetic interference; the displacement physical quantity of dislocation and the acceleration physical quantity of vibration of the tunnel segment are converted into the resistance value of the graphene resistive sensor chip, and the data is analyzed and calculated through the external data analysis terminal, thus obtaining the dislocation condition and the vibration condition of the tunnel segment.

It should be understood that the application of the present disclosure is not limited to the above-mentioned examples. Those of ordinary skill in the art can make improvements or transformations according to the above illustrations, and all these improvements and transformations shall fall within the protection scope of the claims appended.

What is claimed is:

1. An intelligent tunnel segment monitoring system, comprising two displacement transfer plates and a dislocation monitoring sensor, wherein the two displacement transfer plates are respectively arranged on two adjacent tunnel segments; the dislocation monitoring sensor is connected to the two displacement transfer plates; when the two tunnel segments do not have a relative displacement, the two displacement transfer plates are located on the same plane; one of the displacement transfer plates is provided with a data acquisition and transmission device; and the dislocation monitoring sensor is connected to an external data analysis terminal through the data acquisition and transmission device;

wherein the dislocation monitoring sensor comprises a first base, a transmission rod, three telescopic rods and a second base; the first base and the second base are respectively arranged on the two displacement transfer plates; the transmission rod is perpendicular to the displacement transfer plate corresponding to the first base; telescoping directions of every two of the three telescopic rods are perpendicular to each other; the three telescopic rods comprises a first telescopic rod, a second telescopic rod and a third telescopic rod; the first telescopic rod is connected to the second base and is parallel to the transmission rod; the third telescopic rod is connected to the transmission rod.

2. The intelligent tunnel segment monitoring system according to claim 1, wherein each telescopic rod comprises a first rod body, a first elastic member, a second elastic member, a third elastic member and a second rod body which are connected in sequence; a graphene resistive sensor chip is also connected between the first elastic member and the third elastic member; the graphene resistive sensor chip is parallel to an elastic telescoping direction of the second elastic member; and the graphene resistive sensor chip is electrically connected to the data acquisition and transmission device.

3. The intelligent tunnel segment monitoring system according to claim 2, wherein an accommodating slot is formed in the first rod body; the first elastic member, the second elastic member, the third elastic member and the graphene resistive sensor chip are all located in the accommodating slot; and when the two tunnel segments do not have a relative displacement, the second rod body is partially located in the accommodating slot.

4. The intelligent tunnel segment monitoring system according to claim 2, wherein the graphene resistive sensor chip comprises a carrying piece, a graphene conductor layer and a signal transmission line; the graphene conductor layer is arranged in the carrying piece; and the signal transmission line is electrically connected to the graphene conductor layer and the data acquisition and transmission device.

5. The intelligent tunnel segment monitoring system according to claim 1, wherein the data acquisition and transmission device comprises a fixed seat, and a circuit substrate, a data acquisition interface and a wireless signal emission device which are arranged on the fixed seat; the data acquisition interface and the wireless signal emission device are both electrically connected to the circuit substrate; and the data acquisition interface is also electrically connected to the dislocation monitoring sensor.

6. The intelligent tunnel segment monitoring system according to claim 1, wherein each of the two displacement transfer plates is provided with at least three vibration monitoring sensors; the three vibration monitoring sensors are connected to the external data analysis terminal through the data acquisition and transmission device.

7. The intelligent tunnel segment monitoring system according to claim 6, wherein each vibration monitoring sensor comprises a fixed frame, a mass block and a plurality of sensing subassemblies; the mass block is arranged in a center of the fixed frame and may vibrate along a direction perpendicular to a plane where the fixed frame is located; the plurality of sensing subassemblies connect the mass block to the fixed frame and are uniformly distributed along a circumferential direction of the mass block.

8. The intelligent tunnel segment monitoring system according to claim 7, wherein each of the plurality of sensing subassemblies comprises a force transmission rod, a metal equal-strength beam and a graphene resistive sensor chip; the force transmission rod is connected to the mass block and the metal equal-strength beam; the force transmission rod and the metal equal-strength beam are not coplanar; a plane where the force transmission rod is located and a plane where the metal equal-strength beam is located are both perpendicular to a vibration direction of the mass block; one end of the metal equal-strength beam away from the force transmission rod is connected to the fixed frame; and the graphene resistive sensor chip is arranged on the metal equal-strength beam and is electrically connected to the data acquisition and transmission device.

9. The intelligent tunnel segment monitoring system according to claim 7, further comprising a plurality of fixed rods, wherein the plurality of fixed rods are respectively connected to the mass block and are uniformly distributed along the circumferential direction of the mass block; an inner side surface of the fixed frame is provided with an open slot; one end of each fixed rod is inserted into the open slot; two sides of the fixed rod along the direction perpendicular to the plane where the fixed frame is located are provided with elastic members; and the elastic members are connected to the fixed frame.

* * * * *